United States Patent
Wu et al.

(10) Patent No.: US 10,530,267 B1
(45) Date of Patent: Jan. 7, 2020

(54) POWER CONVERTER

(71) Applicant: COTEK ELECTRONIC IND. CO., LTD., Taoyuan (TW)

(72) Inventors: Chun-Wei Wu, Taoyuan (TW);
Chia-Hung Pai, Taoyuan (TW);
Chien-Kang Chang, Taoyuan (TW)

(73) Assignee: COTEK ELECTRONIC IND. CO., LTD., Taoyuan (TW)

( * ) Notice: Subject to any disclaimer, the term of this patent is extended or adjusted under 35 U.S.C. 154(b) by 0 days.

(21) Appl. No.: 16/247,863

(22) Filed: Jan. 15, 2019

(51) Int. Cl.
| H02M 5/00 | (2006.01) |
| H02M 5/458 | (2006.01) |
| H02M 1/14 | (2006.01) |
| H02J 9/06 | (2006.01) |
| H02M 3/337 | (2006.01) |
| H02M 1/00 | (2006.01) |

(52) U.S. Cl.
CPC .......... *H02M 5/4585* (2013.01); *H02J 9/062* (2013.01); *H02M 1/14* (2013.01); *H02M 3/3376* (2013.01); *H02J 2009/063* (2013.01); *H02M 2001/0009* (2013.01)

(58) Field of Classification Search
CPC ...... H02M 5/458; H02M 5/00; H02M 5/4585; H02M 1/14
USPC ................ 363/16, 37, 97, 98, 127, 131, 132
See application file for complete search history.

(56) References Cited

U.S. PATENT DOCUMENTS

| 5,126,585 | A | * | 6/1992 | Boys | ...................... | H02J 9/062 |
| | | | | | | 307/45 |
| 6,310,787 | B2 | * | 10/2001 | Ito | ...................... | H02M 5/4585 |
| | | | | | | 363/17 |
| 6,483,730 | B2 | * | 11/2002 | Johnson, Jr. | ............ | H02J 9/061 |
| | | | | | | 307/66 |
| 6,940,734 | B2 | * | 9/2005 | Okuma | ..................... | H02J 3/16 |
| | | | | | | 363/37 |
| 7,550,872 | B2 | * | 6/2009 | Hoekstra | ................ | H02J 9/062 |
| | | | | | | 307/64 |
| 2013/0235625 | A1 | * | 9/2013 | Yamada | ............. | H02M 5/4585 |
| | | | | | | 363/37 |

FOREIGN PATENT DOCUMENTS

EP    1969694 A1    9/2008

OTHER PUBLICATIONS

US 6,181,581 B1, 01/2001, Johnson, Jr. et al. (withdrawn)

* cited by examiner

*Primary Examiner* — Rajnikant B Patel
(74) *Attorney, Agent, or Firm* — Muncy, Geissler, Olds & Lowe, P.C.

(57) ABSTRACT

A power converter includes an AC power input line, an AC power output line, a neutral line, a first capacitor connected to the AC power input line and the neutral line, a first inductor connected to the AC power input line, a first bus, a second bus, a second capacitor connected to the first bus and the second bus, a first half-bridge circuit connected to the first bus, the second bus and the first inductor, a second half-bridge circuit connected in series with the first half-bridge circuit and connected to the AC power output line, a third half-bridge circuit connected in series with the first half-bridge circuit, a second inductor connected to the third half-bridge circuit and the neutral line, and a controller.

7 Claims, 9 Drawing Sheets

POWER CONVERTER

FIELD OF THE INVENTION

The present invention relates to a power converter, and particularly to a power converter improving issues of discontinuous phase transition current and total harmonic distortion (THD) in an output alternating-current power by using control signals.

BACKGROUND OF THE INVENTION

The U.S. Pat. Nos. 6,310,787 and 6,181,581 as well as European Patent No. 1969694B1 disclose a kind of power converter; however, a control means used in the power converter disclosed by the above patents suffers from issues of discontinuous phase transition current and higher total harmonic distortion (THD) in the output alternating-current power.

SUMMARY OF THE INVENTION

The primary object of the present invention is to solve the issues of discontinuous phase transition current and total harmonic distortion (THD) in an output alternating-current (AC) power of an circuit.

To achieve the above object, the present invention provides a power converter comprising an alternating-current (AC) power input line, an AC power output line, a neutral line, a first capacitor connected to the AC power output line and the neutral line, a first inductor connected to the AC power input line, a first bus, a second bus, a second capacitor connected to the first bus and the second bus, a first half-bridge circuit, a second half-bridge circuit, a third half-bridge circuit, a second inductor and a controller. The first half-bridge circuit comprises a first switch connected to the first bus, and a second switch connected in series with the first switch and connected to the second bus, wherein the first inductor is connected to a node between the first switch and the second switch. The second half-bridge circuit comprises a third switch connected to the first bus, and a fourth switch connected in series with the third switch and connected to the second bus, wherein the AC power output line is connected to a node between the third switch and the fourth switch. The third half-bridge circuit comprises a fifth switch connected to the first bus, and a sixth switch connected in series with the fifth switch and connected to the second bus, wherein one end of the second inductor is connected to a node between the fifth switch and the sixth switch and the other end is connected to the neutral line. The controller provides a control signal to each of the first switch, the second switch, the third switch, the fourth switch, the fifth switch and the sixth switch. The control signal provided for the second half-bridge circuit or the third half-bridge circuit by the controller is generated by comparing a mixed sine wave with a high-frequency triangular carrier, wherein the mixed sine wave is generated by mixing a third-order harmonic of a low-frequency sine wave into the low-frequency sine wave, and the low-frequency sine wave for modulating the control signal of the first half-bridge circuit and the second half-bridge circuit has an inverted phase from the phase of the low-frequency sine wave for modulating the control signal for the third half-bridge circuit.

In one embodiment, the power converter further comprised s a third inductor connected to the AC power output line and connected to the node between the third switch and the fourth switch, and a third capacitor connected to a node between the AC power output line and the neutral line, wherein the third inductor and the third capacitor together form a filter circuit.

In one embodiment, the frequency of the low-frequency sine wave is equal to the frequency of an output AC power inputted to the power converted or outputted from the power converter.

In one embodiment, the control signal provided by the controller to each of the first switch, the second switch, the third switch and the fourth switch is generated by comparing the low-frequency sine wave with the high-frequency triangular carrier.

In one embodiment, the power converter comprises a first differential amplifier, a second differential amplifier, a third differential amplifier, a first current sensing element connected in series with the AC power input line and the first inductor and outputting an input current signal to the controller, a second current sensing element connected in series with the AC power output line and outputting an output current signal to the controller, a third inductor connected to the AC power output line and connected to the node between the third switch and the fourth switch, a third capacitor connected to the node between the AC power output line and the neutral line and forming the filter circuit together with the third inductor, and a third current sensing element connected to the node between the third switch and the fourth switch and connected in series with the third inductor to output an inverter current signal to the controller. The first differential amplifier comprises a first input end connected to the AC power input line, a second input end connected to the neutral line, and a first output end providing an input voltage signal to the controller. The second differential amplifier comprises a third input end connected to the AC power output line, a fourth input end connected to the neutral line, and a second output end providing an output voltage signal to the controller. The third differential amplifier comprises a fifth input end connected to the first bus, a sixth input end connected to the second bus, and a third output end providing a bus voltage signal to the controller. The controller adjusts the control signals outputted to the first half-bridge circuit on the basis of the input current signal, the input voltage signal and the bus voltage signal, and adjusts the control signals outputted to the second half-bridge circuit on the basis of the output current signal, the output voltage signal and the inverter current signal.

In one embodiment, each of the first input end, the second input end, the third input end, the fourth input end, the fifth input end and the sixth input end is provided with a serial voltage dividing resistor, and each of the serial voltage dividing resistor comprises of at least two resistors.

In one embodiment, the power converter comprises a direct-current (DC) power converting circuit connected to the first bus and the second bus.

The present invention provides the following features compared to the prior art. In the power converter of the present invention, the first half-bridge circuit, the second half-bridge circuit and the third half-bridge circuit all adopt high-frequency switching control, and the control signal for controlling the third half-bridge circuit is generated by comparing the mixed sine wave with the high-frequency triangular carrier, wherein the mixed sine wave is generated by mixing a third-order harmonic of the low-frequency sine wave into the low-frequency sine wave. Thus, during phase transition of the output AC power (i.e., from a phase angle of 355 degrees to a phase angle of 5 degrees, or from a phase angle of 175 degrees to a phase angle of 185 degrees), the output current can be kept continuous, thus achieving an advantage of high phase transition stability. Further, the present invention at the same time reduces total harmonic distortion (THD) of the output AC power.

DETAILED DESCRIPTION OF THE PREFERRED EMBODIMENTS

Details and technical contents of the present invention are described with the accompanying drawings below.

Referring to FIG. 1, FIG. 2, FIG. 3 and FIG. 4, the present invention provides a power converter 100. The power converter 100 may be constructed in an uninterrupted power system or a communication apparatus and may be implemented in a plural quantity by series connection. The power converter 100 includes an alternating-current (AC) power input line 11, an AC power output line 12, a neutral line 13, a first capacitor 14 connected to the AC power input line 11 and the neutral line 13, a first inductor 15 connected to the AC power input line 11, a first bus 16, a second bus 17, a second capacitor 18 connected to the first bus 16 and the second bus 17, a first half-bridge circuit 19, a second half-bridge circuit 20, a third half-bridge circuit 21, a second inductor 22 and a controller 23. The AC power input line 11 and the neutral line 13 are respectively connected to positive and negative terminals of an AC power source 50, and the AC power output line 12 and the neutral line 13 are respectively connected to one end of a load 51 so as to provide an output AC power 52 to the load 51. The first half-bridge circuit 19 includes a first switch 191 connected to the first bus 16, and a second switch 192 connected in series to the first switch 191 and connected to the second bus 17. The first inductor 15 is connected to the node between the first switch 191 and the second switch 192. The second half-bridge circuit 20 includes a third switch 201 connected to the first bus 16, and a fourth switch 202 connected in series to the third switch 201 and connected to the second bus 17. The AC power output line 12 is connected to the node between the third switch 201 and the fourth switch 202. The third half-bridge circuit 21 includes a fifth switch 211 connected to the first bus 16, and a sixth switch 212 connected in series with the fifth switch 211 and connected to the second bus 17. One end of the second inductor 22 is connected to the node between the fifth switch 211 and the sixth switch 212, and the other end is connected to the neutral line 13. Further, each of the first switch 191, the second switch 192, the third switch 201, the fourth switch 202, the fifth switch 211 and the sixth switch 212 may be a metal-oxide semiconductor field-effect transistor (MOSFET) or an insulated gate bipolar transistor (IGBT). Further, in the power converter 100 of the present invention, the first capacitor 14, the first inductor 15, the second inductor 22, the first switch 191, the second switch 192, the fifth switch 211 and the sixth switch 212 form a rectification circuit 40. Further, in the power converter 100, the second inductor 22, the third inductor 29, the third switch 201, the fourth switch 202, the fifth switch 211 and the sixth switch 212 form an inverter circuit 41. The rectification circuit 40 is for converting AC power to direct current (DC) power, and the inverter circuit 41 is for converting DC power to AC power.

Figure 1:
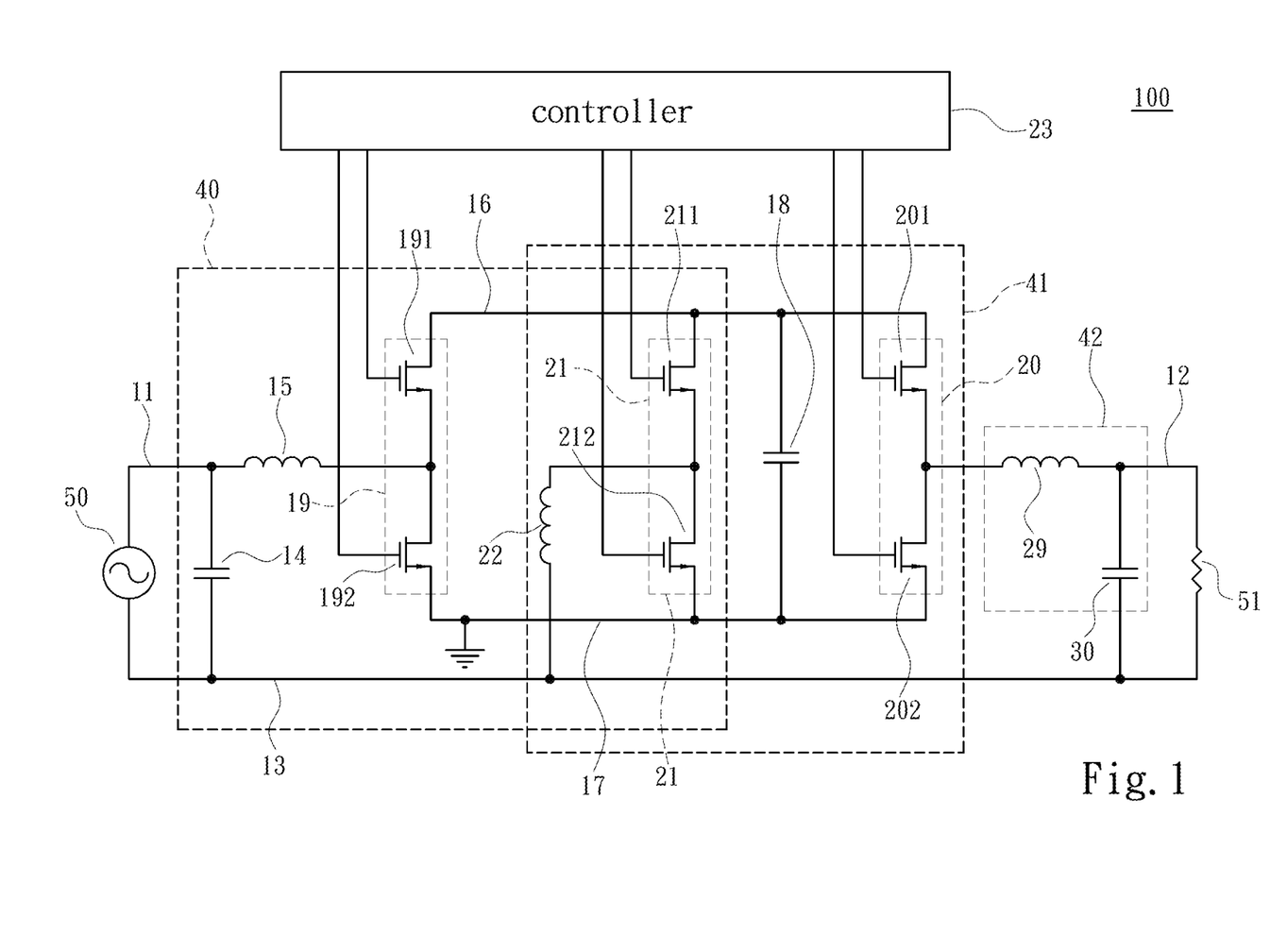
FIG. 1 is a schematic diagram of circuit composition of a power converter according to an embodiment of the present invention.
Figure 2:
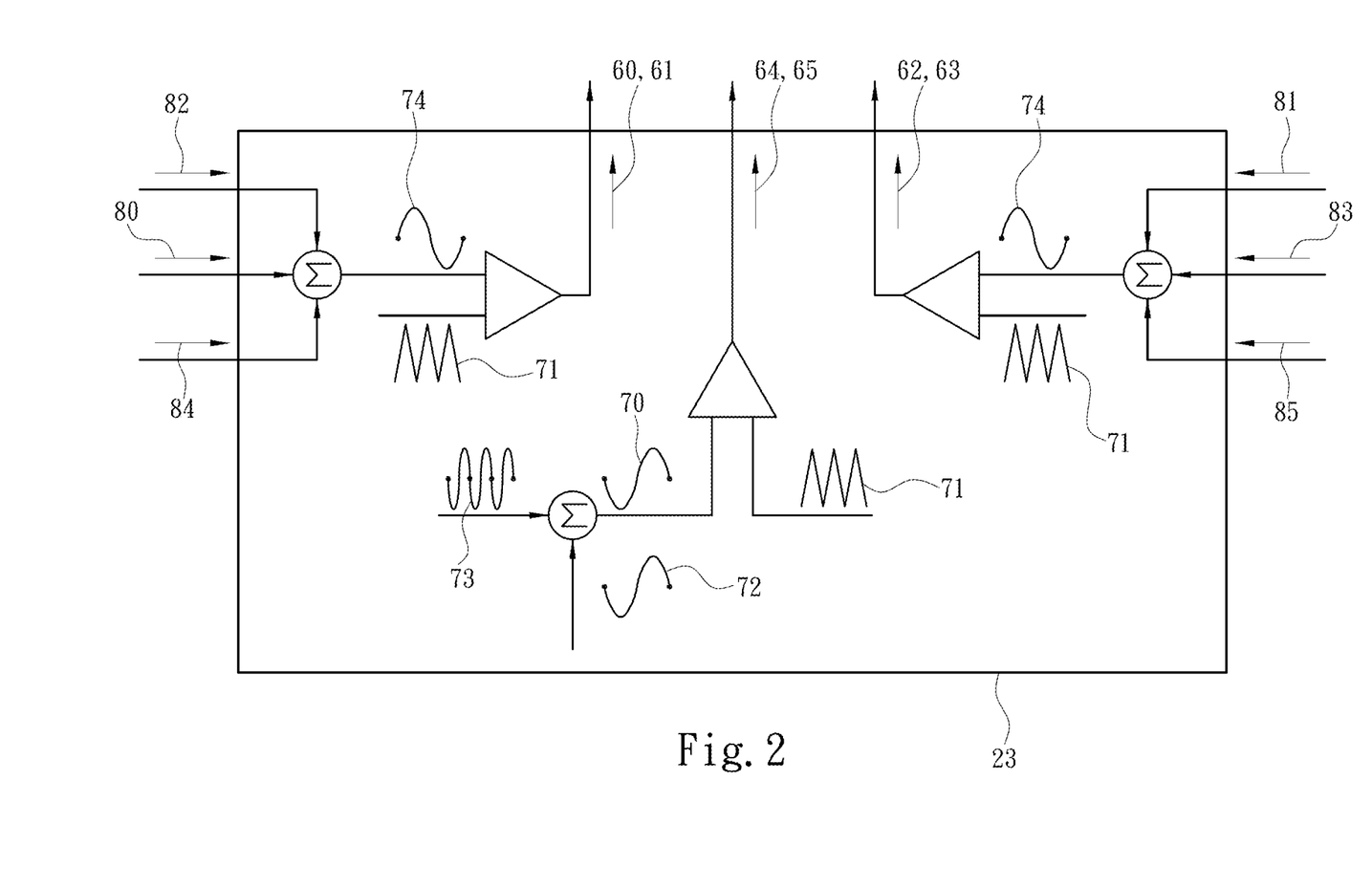
FIG. 2 is a schematic diagram of implementation of a controller generating control signals according to an embodiment of the present invention.
Figure 3:
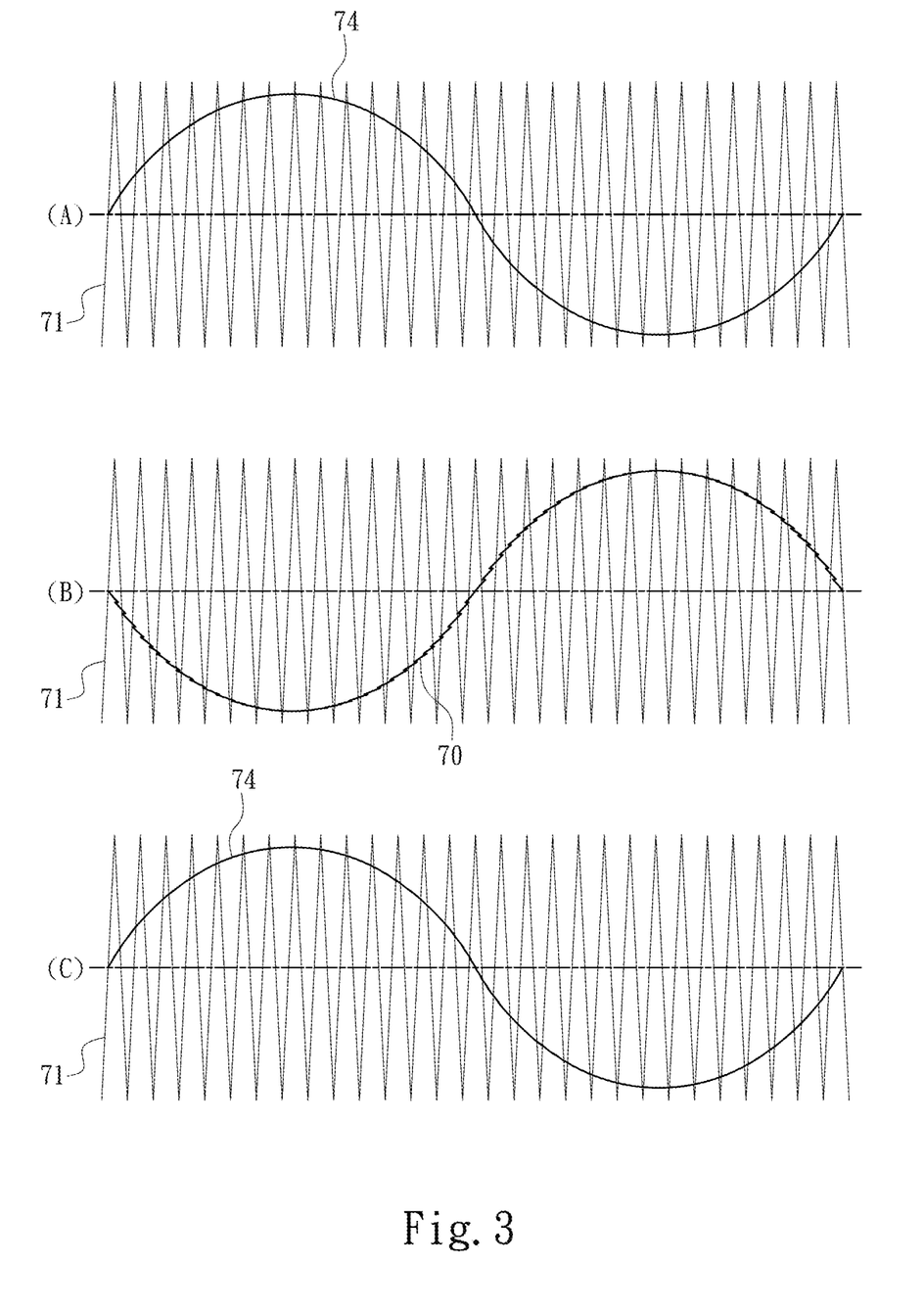
FIG. 3 is a schematic diagram of control signals generated according to an embodiment of the present invention.
Figure 4:
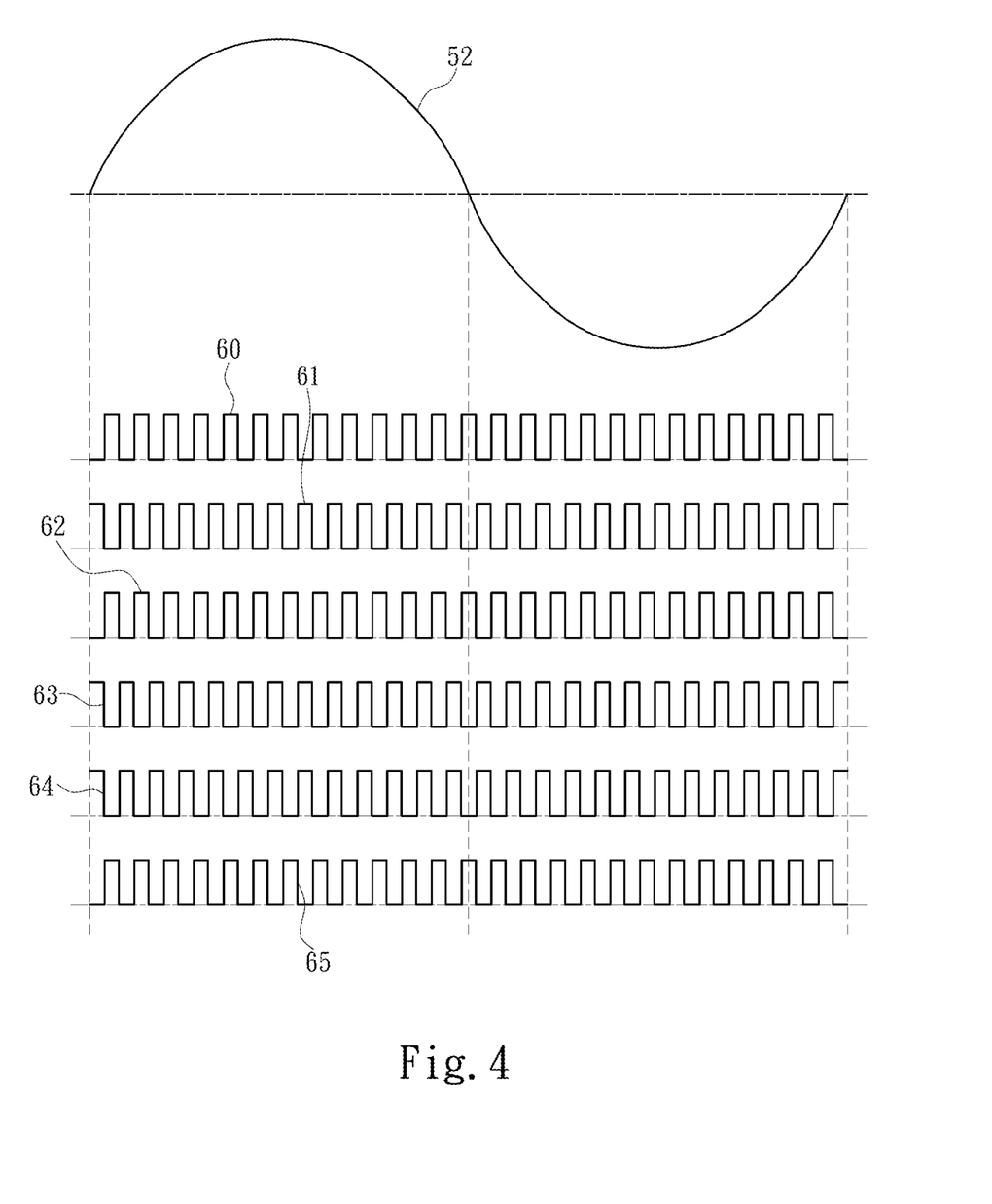
FIG. 4 is a comparison diagram of waveforms control signals and an output alternating-current (AC) power according to an embodiment of the present invention.

Referring to FIG. 1, FIG. 2, FIG. 3, and FIG. 4, the controller 23 is a microcontroller unit (MCU), and the controller 23 is connected to the first switch 191, the second switch 192, the third switch 201, the fourth switch 202, the fifth switch 211 and the sixth switch 212. The controller 23 is configured to individually send a control signal (60, 61, 62, 63, 64, 65) to the first switch 191, the second switch 192, the third switch 201, the fourth switch 202, the fifth switch 211 and the sixth switch 212, wherein each of the control signals (60, 61, 62, 63, 64, 65) is generated through pulse width modulation (PWM). The first switch 191, the second switch 192, the third switch 201, the fourth switch 202, the fifth switch 211 and the sixth switch 212 become a conducted state or a cut-off state on the basis of the respective control signals (60, 61, 62, 63, 64, 65) received. Further, in one embodiment of the present invention, the control signals 64 and 65 which are provided by the controller 23 and transmitted to the third half-bridge circuit 21 are generated by comparing a mixed sine wave 70 with a high-frequency triangular carrier 71 so as to eliminate total harmonic distortion of the output AC power 52 and improve the issue of a discontinuous output current, wherein the mixed sine wave 70 is generated by mixing a third-order harmonic of a low-frequency sine wave 72 (denoted by 73 in the figures) into the low-frequency sine wave 72. The third-order harmonic 73 is a sine wave having a frequency higher than that of the low-frequency sine wave 72. Further, the control signals 64 and 65 received by the fifth switch 211 and the sixth switch 212 may be designed to have mutually inverted phases; that is, the sixth switch 212 is cut off when the fifth switch 211 is conducted, and the sixth switch 212 is conducted when the fifth switch 211 is cut off. Further, the frequency of the low-frequency sine wave 72 is equal to the frequency of the output AC power 52 inputted to the power converter 100 or outputted from the power converter 100. For example, when the frequency of the output AC power 52 is 50 Hz, the frequency of the low-frequency sine wave 72 is also 50 Hz. Further, each of the control signals (60, 61, 62, 63) outputted by the controller 53 to the first switch 191, the second switch 192, the third switch 201 and the fourth switch 202 is respectively generated by comparing another low-frequency sine wave 74 with the high-frequency triangular carrier 71. Further, in one embodiment of the present invention, the low-frequency sine wave 74 for modulating the control signals (60, 61, 62, 63) for the first half-bridge circuit 19 and the second half-bridge circuit 20 have an inverted phase from that of the low-frequency sine wave 72 for modulating the control signals 64 and 65 for the third half-bridge circuit 21. Referring to FIG. 3, wherein FIG. 3(A) and FIG. 3(C) show respectively schematic diagrams of modulation of the control signals 60, 61, 62 and 63 outputted to the first half-bridge circuit 19 and the second half-bridge circuit 20, and FIG. 3(B) shows a schematic diagram of modulation of the control signals 64 and 65 outputted to the third half-bridge circuit 21. Further, the control signals 60 and 61 received by the first switch 191 and the second switch 192 may be designed to have mutually inverted phases, and the control signals 62 and 63 received by the third switch 201 and the fourth switch 202 may be designed to have mutually inverted phases. Such design of having mutually inverted phases is for preventing short-circuitry of the half-bridge circuits, and associated details are undoubtedly known to a person skilled in the art and are thus omitted herein.

Figure 5:
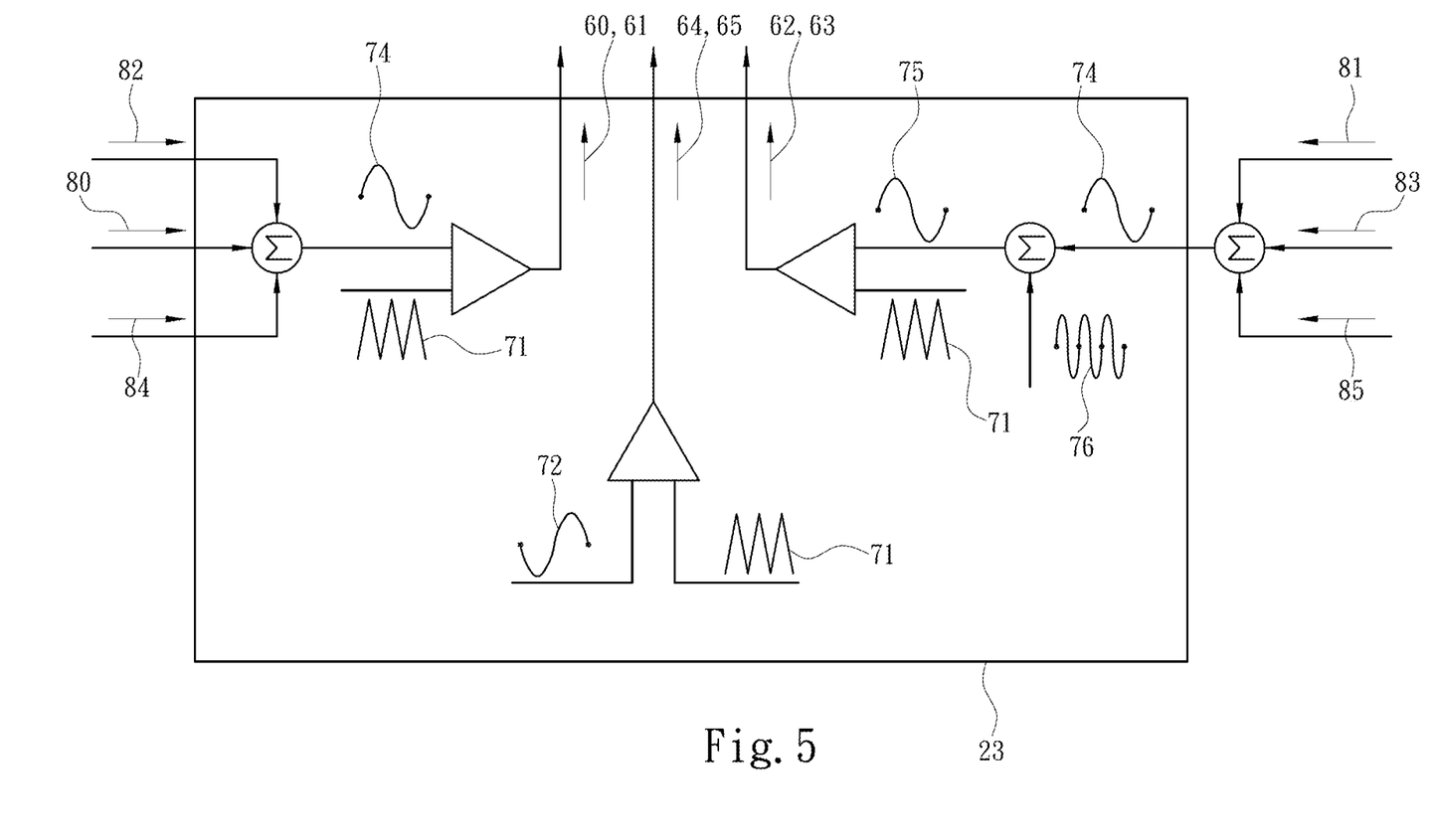
FIG. 5 is a schematic diagram of implementation of a controller generating control signals according to another embodiment of the present invention.
Figure 6:
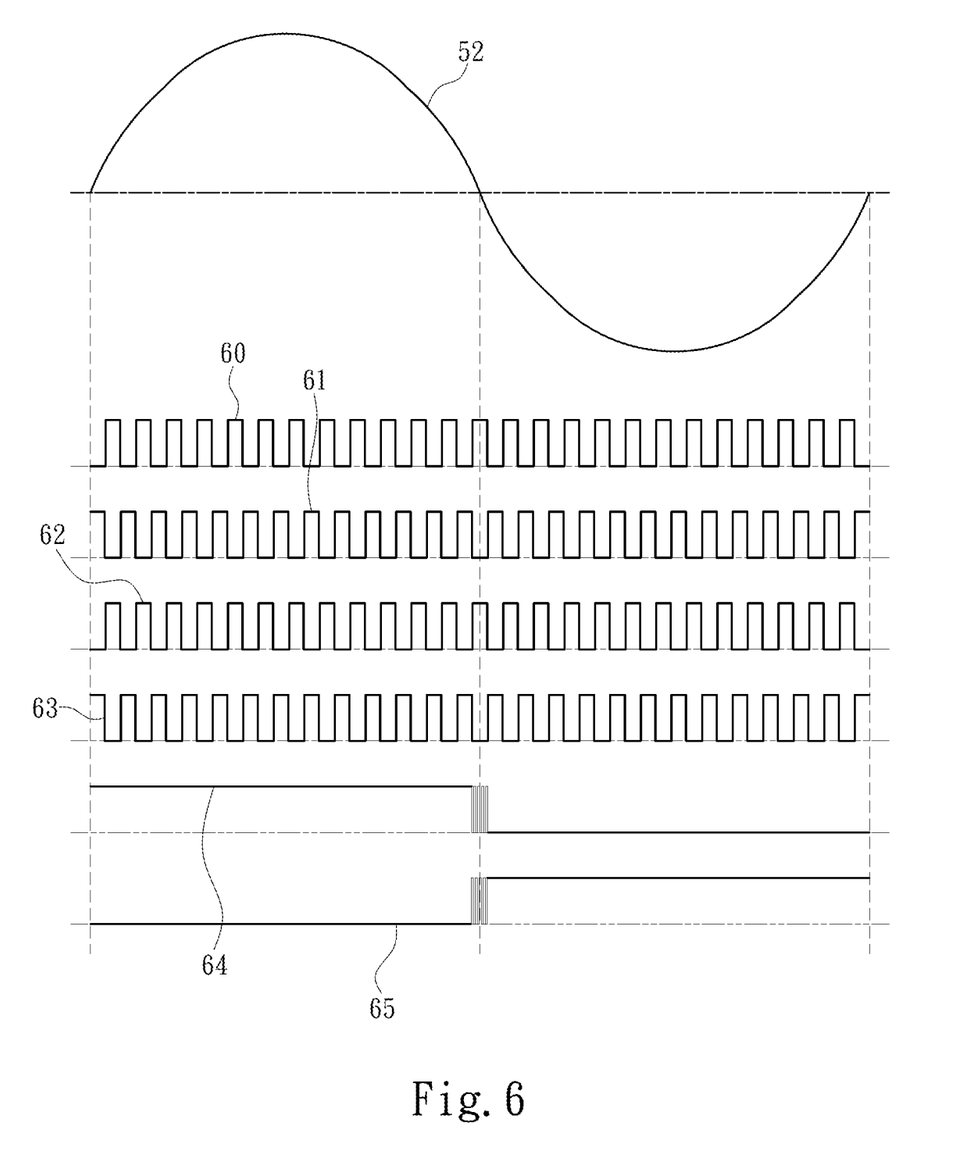
FIG. 6 is a comparison diagram of waveforms control signals and an output AC power according to another embodiment of the present invention.

Referring to FIG. 5, in another embodiment, the control signals 64 and 65 provided for the third half-bridge circuit 21 by the controller 23 are not modulated according to the foregoing embodiment; that is, the control signals 64 and 65 are generated without using the mixed sine wave 70. In this embodiment, the control signals 62 and 63 provided for the second half-bridge circuit 20 by the controller 23 are generated by comparing the mixed sine wave 75 with the high-frequency triangular carrier 71, wherein the mixed sine wave 75 is generated by mixing a third-order harmonic of the low-frequency sine wave 74 (denoted as 76 in the figures) into the low-frequency sine wave 74. Further, in this embodiment, the control signals 60 and 61 used for controlling the first half-bridge circuit 19 may be high-frequency control signals, and the control signals 64 and 65 used for controlling the third half-bridge circuit 21 may be high-frequency control signals or low-frequency control signals according to actual implementation requirements. Further referring to FIG. 6, in one embodiment, the control signals 64 and 65 are fundamentally in low frequencies, and the time point for switching control potentials of the control signals 64 and 65 are corresponding to the time point when the output AC power 52 is between a phase angle of 175 degrees to 185 degrees or 355 degrees to 5 degrees. In this embodiment, the control signals 64 and 65 are implemented by a high frequency in the two intervals above.

Figure 7:
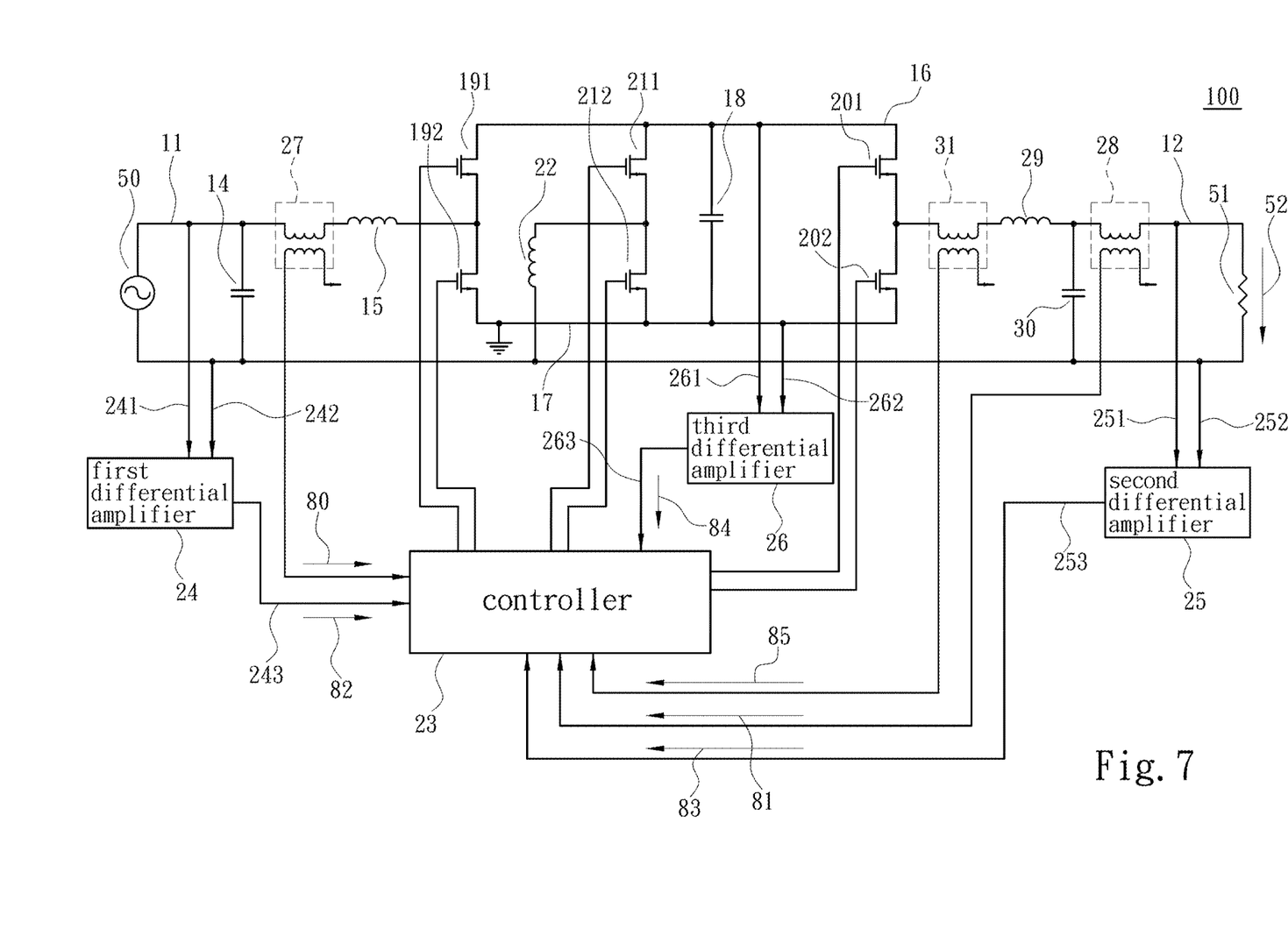
FIG. 7 is a schematic diagram of circuit composition of a power converter according to another embodiment of the present invention.
Figure 8:
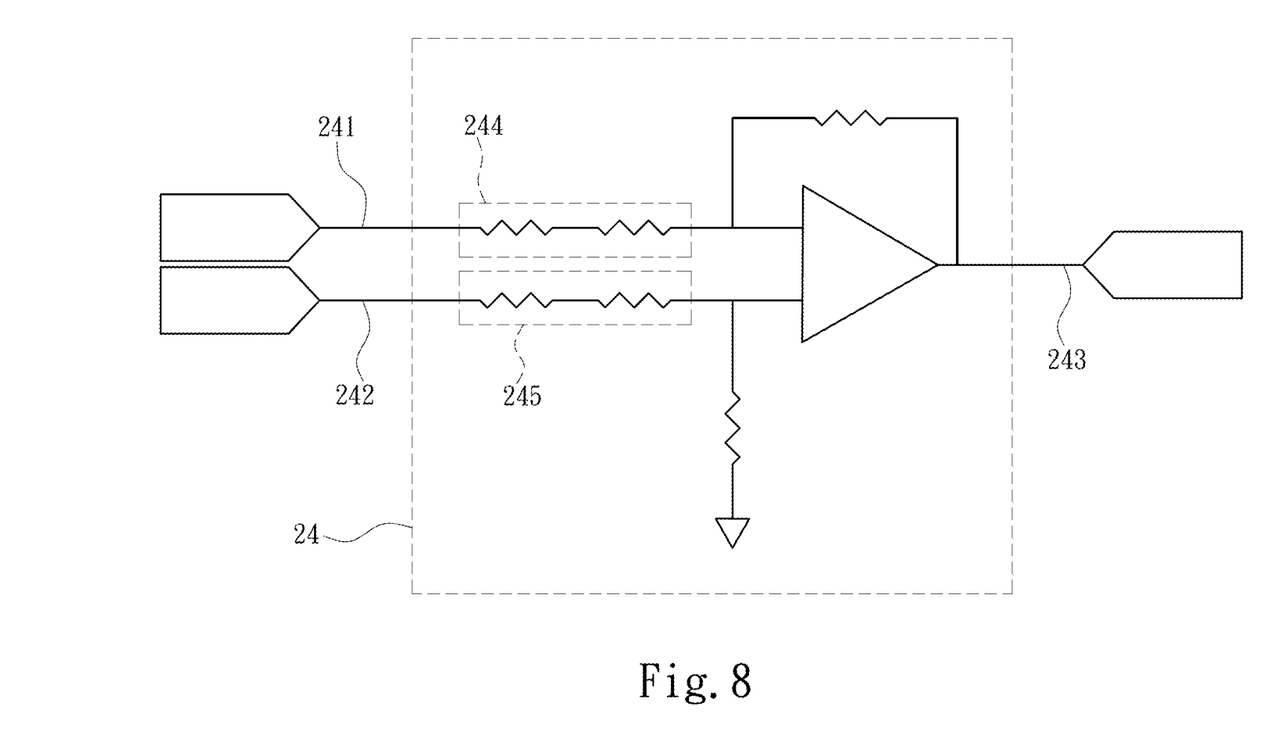
FIG. 8 is a schematic diagram of units of a first differential amplifier according to an embodiment of the present invention.

Also referring to FIG. 7, in one embodiment, the power converter 100 includes a first differential amplifier 24, a second differential amplifier 25, a third differential amplifier 26, a first current sensing element 27 connected in series with the AC power input line 11 and the first inductor 15 and outputting an input current signal 80 to the controller 23, and a second current sensing element 28 connected in series with the AC power output line 12 and outputting an output current signal 81 to the controller 23. The first differential amplifier 24 includes a first input end 241 connected to the AC power input line 11, a second input end 242 connected to the neutral line 13, and a first output end 243 providing an input voltage signal 82 to the controller 23. The second differential amplifier 25 includes a third input end 251 connected to the AC power output line 12, a fourth input end 252 connected to the neutral line 13, and a second output end 253 providing an output voltage signal 83 to the controller 23. The third differential amplifier 26 includes a fifth input end 261 connected to the first bus 16, a sixth input end 262 connected to the second bus 17, and a third output end 263 providing a bus voltage signal 84 to the controller 23. Accordingly, the controller 23 may adjust the control on the first switch 191, the second switch 192, the third switch 201 and the fourth switch 202 according to a current operating status and perform compensation. Referring to FIG. 8, in one embodiment, the first input end 241 and the second input end 242 are respectively provided with serial voltage dividing resistors 244 and 245, wherein each of the serial voltage dividing resistors 244 and 245 comprises at least two resistors. Further, in the drawings of the application, although the drawings of the application shows that the serial voltage dividing resistors 244 and 245 are only provided on the first input end 241 and the second input end 242, in the implementation of the present invention, the third input end 251, the fourth input end 252, the fifth input end 261 and the sixth input end 262 may also be provided with the serial voltage dividing resistor (not shown). Accordingly, the serial voltage dividing resistors 244 and 245 are able to jointly distribute the received voltage and current.

Refer to FIG. 7, the power converter 100 further includes a third inductor 29 connected to the AC power output line 12 and connected to the node between the third switch 201 and the fourth switch 202, and a third capacitor 30 connected to the node between the AC power output line 12 and the neutral line 13, wherein the third inductor 29 and the third capacitor 30 together form a filter circuit 42 to filter out the noise from the inverter circuit 41. Moreover, in this embodiment, the power converter 100 further includes a third current sensing element 31 connected to the node between the third switch 201 and the fourth switch 202 and connected in series with the third inductor 29 so as to output an inverter current signal 85 to the controller 23. The controller 23 adjusts the control signals 60 and 61 outputted to the first half-bridge circuit 19 on the basis of the input current signal 80, the input voltage signal 82 and the bus voltage signal 84, and adjusts the control signals 62 and 63 outputted to the second half-bridge circuit 20 on the basis of the output current signal 81, the output voltage signal 83 and the inverter current signal 85.

Figure 9:
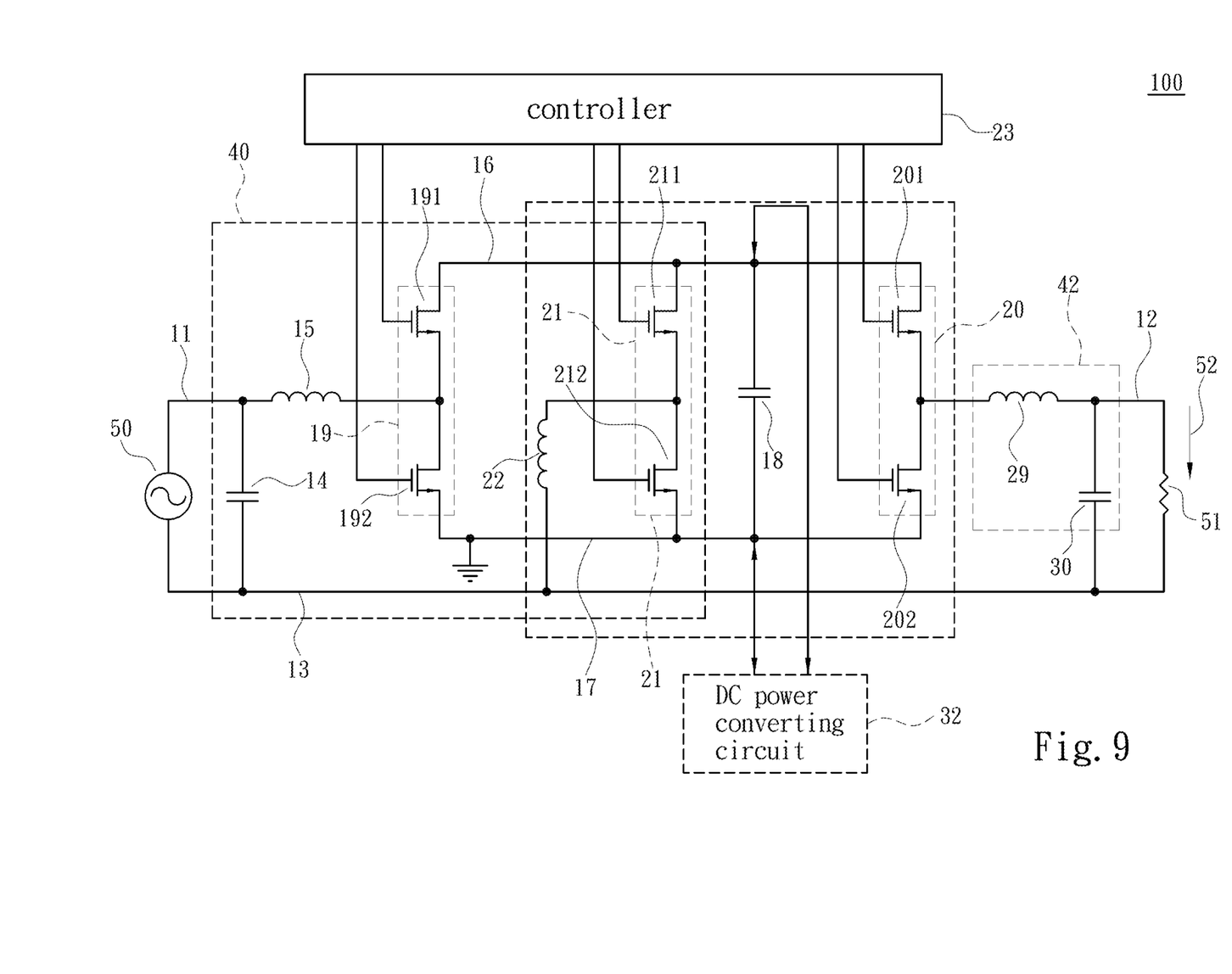
FIG. 9 is schematic diagram of circuit composition of a power converter according to another embodiment of the present invention.

Referring to FIG. 9, in one embodiment, the power converter 100 further includes a DC power converting circuit 32 connected to the first bus 16 and the second bus 17. Further, the DC power converting circuit 32 may be used for modulating DC power or be used to charge an energy storage element included so as to serve as a backup power device of the power converter 100. The energy storage element may be a battery or a super capacitor.

In conclusion, the control signals 62, 63, 64 and 65 for the second half-bridge circuit 20 or the third half-bridge circuit 21 are generated by comparing the mixed sine wave 70 (or 75) with the high-frequency triangular carrier 71. Thus, the output current during the phase transition (i.e., from a phase angle of 355 degrees to a phase angle of 5 degrees or from a phase angle of 175 degrees or a phase angle of 185 degrees) of the output AC power 52 may be kept continuous, achieving the feature of high phase transition stability. Further, the present invention at the same time reduces the total harmonic distortion of the output AC power 52.

What is claimed is:

1. A power converter, comprising:
   an alternating-current (AC) power input line;
   an AC power output line;
   a neutral line;
   a first capacitor, connected to the AC power input line and the neutral line;
   a first inductor, connected to the AC power input line;
   a first bus and a second bus;
   a second capacitor, connected to the first bus and the second bus;

a first half-bridge circuit, comprising a first switch connected to the first bus, and a second switch connected in series with the first switch and connected to the second bus, wherein the first inductor is connected to a node between the first switch and the second switch;

a second half-bridge circuit, comprising a third switch connected to the first bus, and a fourth switch connected in series with the third switch and connected to the second bus, wherein the AC power output line is connected to a node between the third switch and the fourth switch;

a third half-bridge circuit, comprising a fifth switch connected to the first bus, and a sixth switch connected in series with the fifth switch and connected to the second bus;

a second inductor, having one end connected to a node between the fifth switch and the sixth switch and one other end connected to the neutral line; and a controller, providing a control signal to each of the first half-bridge circuit, the second half-bridge circuit and the third half-bridge circuit, wherein the control signal provided for the second half-bridge circuit or the third half-bridge circuit by the controller is generated by comparing a mixed sine wave with a high-frequency triangular carrier, the mixed sine wave is generated by mixing a third-order harmonic of a low-frequency sine wave into the low-frequency sine wave, and the low-frequency sine wave for modulating the control signal of the first half-bridge circuit and the second half-bridge circuit has an inverted phase from the phase of the low-frequency sine wave for modulating the control signal of the third half-bridge circuit.

2. The power converter of claim 1, further comprising a third inductor connected to the AC power output line and connected to the node between the third switch and the fourth switch, and a third capacitor connected to a node between the AC power output line and the neutral line, wherein the third inductor and the third capacitor together form a filter circuit.

3. The power converter of claim 1, wherein a frequency of the low-frequency sine wave is equal to a frequency of an output AC power inputted to the power converter or outputted from the power converter.

4. The power converter of claim 3, wherein the control signal provided for each of the first switch, the second switch, the third switch and the fourth switch by the controller is generated by comparing the low-frequency sine wave with the high-frequency triangular carrier.

5. The power converter of claim 1 further comprises a first differential amplifier, a second differential amplifier, a third differential amplifier, a first current sensing element connected in series with the AC power input line and the first inductor and outputting an input current signal to the controller, a second current sensing element connected in series with the AC power output line and outputting an output current signal to the controller, a third inductor connected to the AC power output line and connected to the node between the third switch and the fourth switch, a third capacitor connected to the node between the AC power output line and the neutral line and forming a filter circuit together with the third inductor, and a third current sensing element connected to the node between the third switch and the fourth switch and connected in series with the third inductor to output an inverter current signal to the controller;

wherein the first differential amplifier comprises a first input end connected to the AC power input line, a second input end connected to the neutral line, and a first output end providing an input voltage signal to the controller, the second differential amplifier comprises a third input end connected to the AC power output line, a fourth input end connected to the neutral line, and a second output end providing an output voltage signal to the controller, the third differential amplifier comprises a fifth input end connected to the first bus, a sixth input end connected to the second bus, and a third output end providing a bus voltage signal to the controller, and the controller adjusts the control signals outputted to the first half-bridge circuit on a basis of the input current signal, the input voltage signal and the bus voltage signal, and adjusts the control signals outputted to the second half-bridge circuit on a basis of the output current signal, the output voltage signal and the inverter current signal.

6. The power converter of claim 5, wherein each of the first input end, the second input end, the third input end, the fourth input end, the fifth input end and the sixth input end is provided with a serial voltage dividing resistor, and each of the serial voltage dividing resistors comprises of at least two resistors.

7. The power converter of claim 1, further comprising a direct-current (DC) power converting circuit connected to the first bus and the second bus.

* * * * *